United States Patent
Wang et al.

(10) Patent No.: US 10,834,186 B2
(45) Date of Patent: Nov. 10, 2020

(54) DISASTER RECOVERY SWITCHOVER METHOD AND SYSTEM, AND NODE

(71) Applicant: HUAWEI TECHNOLOGIES CO., LTD., Guangdong (CN)

(72) Inventors: Sinan Wang, Shenzhen (CN); Guogen Zhang, Shenzhen (CN); Chaoli Qin, Dongguan (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/264,105

(22) Filed: Jan. 31, 2019

(65) Prior Publication Data
US 2019/0166198 A1 May 30, 2019

Related U.S. Application Data

(63) Continuation of application No. PCT/CN2017/079589, filed on Apr. 6, 2017.

(30) Foreign Application Priority Data

Aug. 5, 2016 (CN) .......................... 2016 1 0640809

(51) Int. Cl.
*H04L 29/08* (2006.01)
*H04L 12/24* (2006.01)
(Continued)

(52) U.S. Cl.
CPC ...... *H04L 67/1095* (2013.01); *H04L 41/0659* (2013.01); *H04L 41/0695* (2013.01); *H04L 43/0817* (2013.01); *H04L 69/40* (2013.01)

(58) Field of Classification Search
CPC ............. H04L 41/0668; H04L 41/0659; H04L 41/0695; H04L 69/40; H04L 41/069;
(Continued)

(56) References Cited

U.S. PATENT DOCUMENTS

2011/0072122 A1* 3/2011 Miller ................ G06F 11/1662
709/223
2013/0080823 A1 3/2013 Roth et al.
(Continued)

FOREIGN PATENT DOCUMENTS

CN 101060391 A 10/2007
CN 101656624 A 2/2010
(Continued)

OTHER PUBLICATIONS

Yu Er:"The Research of Disaster Tolerant Recover of the Virtualization System in the Colleges and Universities of Public Security", Netinfo Security, pp. 93-96. with English abstract.

*Primary Examiner* — Abdullahi E Salad
(74) *Attorney, Agent, or Firm* — Womble Bond Dickinson (US) LLP

(57) ABSTRACT

A disaster recovery switchover system, the disaster recovery switchover system includes a production node, a redundancy node, and a recording node, the production node currently runs a first production service, and the method includes: receiving, by the recording node, first restoration information sent by the production node, where the first restoration information is information required for restoring the first production service to a latest running status of the first production service; and sending, by the recording node when determining that the first production service needs to be restored on the redundancy node, second restoration information to the redundancy node, where the second restoration information is information that is obtained according to the first restoration information and that is required to restore the first production service on the redundancy node, so that the redundancy node switches the first production service to the redundancy node according to the second restoration information.

17 Claims, 6 Drawing Sheets

(51) Int. Cl.
*H04L 12/26* (2006.01)
*H04L 29/14* (2006.01)

(58) Field of Classification Search
CPC ............. H04L 67/1095; H04L 43/0817; H04L 67/1002; G06F 11/1662; G06F 11/2041; G06F 11/2028; G06F 11/2097
See application file for complete search history.

(56) References Cited

U.S. PATENT DOCUMENTS

| | | | | |
|---|---|---|---|---|
| 2014/0229606 | A1* | 8/2014 | Griswold | H04L 41/0677 709/224 |
| 2015/0172111 | A1* | 6/2015 | Lalsangi | H04L 67/1042 709/220 |
| 2015/0230078 | A1* | 8/2015 | Kandangath | H04L 67/1095 707/647 |
| 2015/0317223 | A1 | 11/2015 | Cho et al. | |
| 2015/0331766 | A1* | 11/2015 | Sarfare | G06F 11/1662 714/4.11 |
| 2016/0028888 | A1* | 1/2016 | Kolesov | H04L 65/105 379/265.04 |
| 2017/0235647 | A1* | 8/2017 | Kilaru | G06F 11/2094 707/652 |
| 2018/0324143 | A1* | 11/2018 | Harvey | H04L 63/02 |

FOREIGN PATENT DOCUMENTS

| | | |
|---|---|---|
| CN | 101729290 A | 6/2010 |
| CN | 103873286 A | 6/2014 |
| CN | 103885854 A | 6/2014 |
| CN | 104572355 A | 4/2015 |
| CN | 104794012 A | 7/2015 |

* cited by examiner

DISASTER RECOVERY SWITCHOVER METHOD AND SYSTEM, AND NODE

CROSS-REFERENCE TO RELATED APPLICATIONS

This application is a continuation of International Application No. PCT/CN2017/079589, filed on Apr. 6, 2017, which claims priority to Chinese Patent Application No. 201610640809.X, filed on Aug. 5, 2016. The disclosures of the aforementioned applications are hereby incorporated by reference in their entireties.

TECHNICAL FIELD

The present invention relates to the field of redundancy technologies, and in particular, to a disaster recovery switchover method and system, and a node.

BACKGROUND

Currently, an active/standby backup policy, together with a data redundancy technology, is mainly used to ensure reliability and security of a local database system. The data redundancy technology means that a remote database redundancy system is established, to store at least mission-critical service data in the local database system. This may be real-time full replication of the local database system. When a disaster occurs on the local database system or the local mission-critical service data, the database redundancy system can provide the local database system with data required for restoration. To ensure data consistency between the database redundancy system and the local database system, data in the local database system needs to be synchronized to the database redundancy system.

The data redundancy technology mainly includes a synchronous replication mode and an asynchronous replication mode. In the synchronous replication mode, production data is replicated to the remote database redundancy system in a fully synchronized manner. Although the synchronous replication mode can ensure that the data in the local database system is fully consistent with that in the redundancy system, network latency between the local database system and the database redundancy system may degrade performance of the local database system. Therefore, during actual deployment, to reduce impact of the network latency, a high-speed network is required to connect the local database system and the database redundancy system. However, to ensure disaster tolerance of the database redundancy system, the local database system is usually far away from the database redundancy system. Consequently, the performance of the local database system is affected.

In the asynchronous replication mode, production data is replicated to the remote database redundancy system in a background synchronization manner. This does not require complete consistency between the local database system and the database redundancy system. Therefore, in this mode, the performance of the local database system is not affected by network latency between the local database system and the database redundancy system. However, in the asynchronous replication mode, the complete consistency is not ensured. When data is restored by using the database redundancy system, a loss of differential data may be caused because of a data difference. Particularly, poorer network transmission quality or higher network latency between the local database system and the database redundancy system may cause a larger data difference.

Neither of the foregoing two synchronization modes can ensure no loss of differential data while ensuring stable performance of the local database system.

SUMMARY

The present invention provides a disaster recovery switchover method and system, and a node, so as to resolve a problem of a data loss during a disaster recovery switchover in an existing mechanism.

A first aspect provides a disaster recovery switchover method, where the method is applied to a disaster recovery switchover system, the disaster recovery switchover system includes a production node, a redundancy node, and a recording node, the production node currently runs a first production service, and the method includes: receiving, by the recording node, first restoration information sent by the production node, where the first restoration information is information required for restoring the first production service to a latest running status of the first production service; and sending, by the recording node, second restoration information to the redundancy node when the recording node detects that a communication connection to the production node becomes faulty and may determine that the first production service needs to be restored on the redundancy node, where the second restoration information is information that is obtained according to the first restoration information and that is required to restore the first production service on the redundancy node, so that the redundancy node switches the first production service to the redundancy node according to the second restoration information.

The recording node receives the first restoration information and sends the second restoration information to the redundancy node, so that the redundancy node can restore the first production service to the latest running status on the production node, thereby implementing a rapid switchover of a production service, and ensuring stability of the production service. In addition, disaster tolerance of the recording node is higher than that of the production node. Therefore, when the production node is damaged, the recording node can still work normally, thereby improving disaster tolerance of data. Moreover, the recording node and the production node are deployed at a same location. Therefore, unlike the prior art in which a same network architecture needs to be deployed for a redundancy node and a production node that are far away from each other, a data transmission rate between the recording node and the production node can be ensured with relatively low network deployment costs, and impact of network transmission on performance of the production node or on data consistency can be reduced.

In a synchronous replication mode of an existing mechanism, to ensure disaster tolerance of a redundancy system, when data is synchronized to a remote redundancy system that is relatively far away, performance of the redundancy system is degraded because of network latency. In comparison with the synchronous replication mode of the existing mechanism, in the present invention, the recording node deployed at the same location with the production node is used to synchronously back up characteristics of the first restoration information, so as to ensure restoration information consistency between the production node and the recording node. When the first production service needs to be restored subsequently, the recording node can provide the redundancy node with the second restoration information, so that data of the redundancy node is consistent with that of the production node, and the first production service can be restored to the latest running status on the redundancy node. In comparison with an existing synchronization mechanism, the production node only needs to be consistent with the recording node, but does not need to be consistent with the redundancy node. The recording node and the production node are deployed at the same location, so that the network latency is reduced, thereby avoiding a problem of performance degradation caused in the synchronous replication mode. In addition, in the synchronous replication mode of the existing mechanism, to ensure the disaster tolerance of the redundancy system, a high-speed network device is required to synchronize data with the remote redundancy system to ensure data consistency. However, the performance of the redundancy system is affected. In the present invention, the recording node deployed at the same location with the production node is used to synchronously back up the first restoration information, and the recording node provides the redundancy node with characteristics of the second restoration information. Without a high-speed network device, data consistency between the production node and the redundancy node can still be ensured.

In an asynchronous replication mode of the existing mechanism, when data is backed up to the remote redundancy system, there is a relatively large data difference between the production node and the redundancy node because of network latency. In the present invention, the recording node deployed at the same location with the production node is used to synchronously back up the characteristics of the first restoration information, and a transmission rate of the first restoration information can be ensured without considering the network latency, thereby ensuring restoration information consistency between the production node and the recording node. When the first production service needs to be restored subsequently, the recording node can provide the redundancy node with the second restoration information, so that data of the redundancy node is consistent with that of the production node, and performance of the production node can be ensured.

It can be learned that, in embodiments of the present invention, system performance of the production node can be ensured, and no loss of differential restoration information between the production node and the redundancy node can be ensured.

In one embodiment, the recording node may be a high-stability device. The high-stability device has high disaster tolerance, cannot be easily damaged, and can be easily deployed. Therefore, if the high-stability device is used to back up restoration information generated by the production node, the disaster tolerance can further be improved, and normal running of the production service can be ensured. Moreover, the recording node only needs to receive, store, and send the restoration information, with no need to run a service like the production node or the redundancy node. Therefore, a structure of the recording node is simpler, and after being designed as the high-stability device, the recording node can have higher redundancy performance than the production node.

In an actual application scenario, according to one embodiment, to further reduce a data processing volume, a loss of differential data, and synchronization efficiency of the disaster recovery switchover system, real-time synchronization can be implemented in a manner of synchronizing a log, and system performance of the entire disaster recovery switchover system is not affected by a large amount of data that needs to be synchronized. Therefore, the second restoration information may include at least one first log. The first log is a log that is generated when the production node runs the first production service before becoming faulty and that is not stored in the redundancy node.

Correspondingly, the recording node sends the second restoration information to the redundancy node, so that the redundancy node can receive and store the at least one first log in the second restoration information, and switch the started first production service to a target running status according to a generation sequence of each first log, where the target running status is a running status, corresponding to a first log with a latest generation time in the at least one first log, of the first production service. Therefore, the redundancy node can identify, according to the generation sequence of the first log, the at least one first log that is not stored, unnecessary log receiving is reduced, and disaster recovery switchover efficiency is improved.

To further increase a speed of identifying a log that needs to be backed up, according to one embodiment, the second restoration information may further include a sequence number of the first log. Log sequence numbers are arranged in an ascending order according to a log generation sequence. Therefore, the sequence number of the first log may be used by the redundancy node to determine the generation sequence of the first log on the production node. The following specifically describes a process in which the recording node sends the second restoration information to the redundancy node:

The recording node sends the sequence number of the first log and the first log to the redundancy node, so that the redundancy node compares the sequence number of the first log with a sequence number of a latest log stored in the redundancy node, receives and stores, when determining that the sequence number of the first log is greater than the sequence number of the latest log, a log whose sequence number is greater than that of the first log in the first log, and switches the started first production service to a target running status according to the log whose sequence number is greater than that of the first log, where the target running status is a running status corresponding to a log with a latest generation time in the log whose sequence number is greater than that of the first log, and the target running status may or may not be the latest running status of the first production service on the production node.

In addition, according to one embodiment, after receiving the first restoration information sent by the production node, the recording node further sends, to the production node, a synchronization response corresponding to the first restoration information. The synchronization response is used to notify the production node that latest restoration information currently stored in the recording node is the first restoration information. It is assumed that the first restoration information includes a second log. After generating the second log, the production node first sends the generated second log to a cache queue and then synchronizes the second log to the recording node. When the second log is synchronized between the production node and the recording node, an asynchronous transfer mode or a synchronous transfer mode is mainly used, to implement synchronous backup of a log between the production node and the recording node. The following description is provided separately by using an example in which the production node sends the second log to the recording node:

1. Implementing the Synchronous Backup in the Asynchronous Transfer Mode:

After receiving the second log sent by the production node, the recording node sends, to the production node, a synchronization response identifying a sequence number of the second log. Regardless of whether the production node receives the synchronization response corresponding to the second log, the recording node soon receives a log that is sent by the production node and whose generation time is later than that of the second log.

In the asynchronous transfer mode, the production node does not need to wait for a synchronization response returned by the recording node, but directly sends a log subsequent to the second log to the recording node. Certainly, the production node may send the second log in the cache queue to the redundancy node. In the asynchronous transfer mode, data backup efficiency can be improved, and system stability can be improved.

2. Implementing the Synchronous Backup in the Synchronous Transfer Mode:

After receiving the second log sent by the production node, the recording node may store the first log in an order of log sequence numbers and record a sequence number of the second log according to a log generation sequence. The recording node sends, to the production node, a synchronization response identifying the sequence number of the second log, where the synchronization response is used to notify the production node of the second log currently updated in the recording node, so that the production node sends the second log to the redundancy node.

Then, the recording node receives a log that is sent by the production node and whose generation time is later than that of the second log. In the synchronous transfer mode, only after receiving a synchronization response returned by the recording node, the production node can send, to the redundancy node, the second log sent to the cache queue, and then send a log subsequent to the second log in the cache queue to the recording node, and then go round in circles. In the synchronous transfer mode, no data loss can be ensured, and data stability can be improved.

In addition, after the production node sends the second log to the redundancy node, to ensure accuracy of real-time log synchronization between the production node, the redundancy node, and the recording node, the production node may further notify the recording node, so as to check a current synchronization status. Therefore, after receiving the first restoration information sent by the production node, the recording node further receives a synchronization acknowledgement notification message sent by the production node. The synchronization acknowledgement notification message is used to indicate that synchronization between a log stored in the production node and a log stored in the redundancy node is complete, and indicate that latest restoration information currently stored in the redundancy node is the first restoration information. The notification message may include a field used to identify the first restoration information, so that the recording node can check locally stored latest restoration information according to the field.

In some embodiments, on the redundancy node end, some logs of a production service are ineffective because of some factors. Therefore, corresponding effective logs need to be re-obtained to restore the ineffective logs. Related logs are synchronized between the recording node and the production node, and the redundancy node may request to obtain the effective logs from the recording node, which is specifically as follows:

The recording node receives a request message sent by the redundancy node, where the request message is used to request to obtain a to-be-restored log, the request message may carry a sequence number of the to-be-restored log, and the sequence number may be a sequence number of a single log, a sequence number of a log whose generation time is the earliest in the to-be-restored log, or multiple sequence numbers. Correspondingly, the to-be-restored log includes a log corresponding to a sequence number, or includes a log corresponding to a sequence number greater than a sequence number.

The recording node sends the to-be-restored log to the redundancy node, so that the redundancy node restores a locally stored log of the first production service according to the to-be-restored log.

In some networking architectures, if the recording node merely performs incremental backup on a log generated by the production node, instead of forwarding the log as a relay, and if the first production service becomes faulty or the production node becomes faulty, the recording node establishes a communication connection to the redundancy node by sending a connection request according to a preset frequency, so that the redundancy node starts the first production service according to the connection request. Then, a differential log of the redundancy node relative to the production node is sent to the redundancy node, so that the redundancy node can replay the log, and the first production service can be restored on the redundancy node.

In addition, the connection request may further carry location information of the production node, where the location information may be used by a system maintenance engineer to accurately locate the recording node. Node information of the production node that is equipped with the recording node can be determined according to the location information of the recording node, thereby reducing searching time. The connection request is sent according to a preset frequency. Therefore, a probability that the connection request is received by the redundancy node can be increased.

The location information is used by the redundancy node to determine at least one of the following: node information of the production node that becomes faulty, node information of the production node to which the first production service belongs, or a process number of the first production service. The node information includes a serial number and/or location information of the production node.

A second aspect provides a disaster recovery switchover method, where the method is applied to a disaster recovery switchover system, the disaster recovery switchover system includes a production node, a redundancy node, and a recording node, the production node currently runs a first production service, and the method includes:

generating, by the production node, first restoration information corresponding to the first production service, where the first restoration information is information required for restoring the first production service to a latest running status of the first production service; and synchronizing, by the production node, the first restoration information to the recording node, so that the recording node stores the first restoration information in an incremental storage manner, and sends, when determining that the first production service needs to be restored on the redundancy node, second restoration information to the redundancy node, and the redundancy node switches the first production service to the redundancy node according to the second restoration information, where the second restoration information is information that is obtained according to the first restoration information and that is required to restore the first production service on the redundancy node. The production node synchronizes restoration information to the recording node. Therefore, when a fault occurs, the recording node can send, to the redundancy node, restoration information that has not been backed up on the redundancy node, and the first production service can continue to be run on the redundancy node, thereby ensuring normal running of a production service, and improving system stability.

To further reduce a data processing volume, a loss of differential data, and synchronization efficiency of the disaster recovery switchover system, according to one embodiment, real-time synchronization can be implemented in a manner of synchronizing a log, and system performance of the entire disaster recovery switchover system is not affected by a large amount of data that needs to be synchronized. Therefore, the second restoration information may include at least one first log. The first log is a log that is generated when the production node runs the first production service before becoming faulty and that is not stored in the redundancy node.

When the first restoration information includes a second log, two synchronization modes by using which the production node synchronizes the second log to the recording node are described.

A synchronous transfer mode: The production node generates the second log, sends the second log to the recording node, performs, after receiving a synchronization response returned by the recording node, a data operation corresponding to the second log, where the synchronization response is used to notify the production node of the second log currently updated in the recording node, and then may further send the second log to the redundancy node and send, to the recording node, a log whose generation time is later than that of the second log. In the synchronous transfer mode, no data loss can be ensured, and data stability can be improved.

In the synchronous transfer mode, after performing the data operation corresponding to the second log, the production node sends the second log to the redundancy node; and after receiving an acknowledgement response (which may be used to indicate that a latest log currently stored in the redundancy node is the second log) returned by the redundancy node, the production node may further send a synchronization acknowledgement message to the recording node. The synchronization acknowledgement message may be used to indicate that synchronization between a log stored in the production node and a log stored in the redundancy node is complete, and indicate that a latest log currently stored in the redundancy node is the second log. The synchronization acknowledgement message may include a field used to identify a sequence number of the second log, so that the recording node may check a locally stored latest log according to the field, to ensure accuracy of real-time log synchronization between the production node, the redundancy node, and the recording node.

After sending the synchronization acknowledgement message to the recording node, the production node sends, to the recording node, the log whose generation time is later than that of the second log.

An asynchronous transfer mode: The production node generates the second log, performs a data operation corresponding to the second log, sends the second log to the recording node, and may further send, to the recording node, a log whose generation time is later than that of the second log. In the asynchronous transfer mode, data backup efficiency can be improved, and system stability can be improved.

In the asynchronous transfer mode, according to one embodiment, after sending the second log to the recording node, the production node sends the second log to the redundancy node; and after receiving an acknowledgement response (which may be used to indicate that latest restoration information currently stored in the redundancy node is the first restoration information) returned by the redundancy node, the production node may further send a synchronization acknowledgement message to the recording node. The synchronization acknowledgement message is used to indicate that synchronization between a log stored in the production node and a log stored in the redundancy node is complete, and indicate that a latest log currently stored in the redundancy node is the second log. The synchronization acknowledgement message may include a field used to identify the second log, so that the recording node may check a locally stored latest log according to the field, to ensure accuracy of real-time log synchronization between the production node, the redundancy node, and the recording node.

In some scenarios, on the redundancy node end, some logs of a production service are ineffective because of some factors. Therefore, corresponding effective logs need to be re-obtained to restore the ineffective logs and may be obtained from the production node, which is specifically as follows:

The production node receives a request message sent by the redundancy node, where the request message is used to request to obtain a to-be-restored log, the request message may carry a sequence number of the to-be-restored log, and the sequence number may be a sequence number of a single log, a sequence number of a log whose generation time is the earliest in the to-be-restored log, or multiple sequence numbers. Correspondingly, the to-be-restored log includes a log corresponding to a sequence number, or includes a log corresponding to a sequence number greater than a sequence number.

Then, the production node sends the to-be-restored log to the redundancy node, so that the redundancy node restores a locally stored log of the first production service according to the to-be-restored log. Data stability can be improved by restoring the log.

A third aspect provides a disaster recovery switchover method, where the method is applied to a disaster recovery switchover system, the disaster recovery switchover system includes a production node, a redundancy node, and a recording node, the production node currently runs a first production service, and the method includes:

receiving, by the redundancy node, second restoration information that is obtained according to the first restoration information and that is sent by the recording node, and switching the first production service to the redundancy node according to the second restoration information, where the second restoration information includes information required for restoring the first production service on the redundancy node, and the first restoration information is information required for restoring the first production service to a latest running status of the first production service. The first production service is restored to the latest running status on the production node by using the second restoration information, thereby implementing seamless switchover of a service, and ensuring service stability.

To further reduce a data processing volume, a loss of differential data, and synchronization efficiency of the disaster recovery switchover system, according to one embodiment, real-time synchronization can be implemented in a manner of synchronizing a log, and system performance of the entire disaster recovery switchover system is not affected by a large amount of data that needs to be synchronized. Therefore, the second restoration information may include at least one first log. The first log is a log that is generated when the production node runs the first production service before becoming faulty and that is not stored in the redundancy node.

Correspondingly, a process of the receiving, by the redundancy node, second restoration information that is obtained according to the first restoration information and that is sent by the recording node, and switching the first production service to the redundancy node according to the second restoration information is as follows:

storing, by the redundancy node, the at least one first log in the restoration information, and switching the started first production service to a target running status according to a generation sequence of the first log, where the target running status is a running status, corresponding to a first log with a latest generation time in the at least one first log, of the first production service. Therefore, the redundancy node can identify, according to the generation sequence of the first log, the at least one first log that is not stored, unnecessary log receiving is reduced, and disaster recovery switchover efficiency is improved.

According to one embodiment, after receiving the first sequence number and the first log, the redundancy node compares the first sequence number with a sequence number of a latest log stored in the redundancy node.

When determining that the first sequence number is greater than the sequence number of the latest log, the redundancy node obtains and stores a log whose sequence number is greater than the first sequence number in the first log.

The redundancy node switches the started first production service to a target running status according to the log whose sequence number is greater than the first sequence number. The target running status is a running status corresponding to a latest log in the log whose sequence number is greater than the first sequence number, and the target running status may or may not be the latest running status of the first production service on the production node. Therefore, a speed of identifying, by the redundancy node, a log that needs to be backed up can be increased by carrying a log sequence number in restoration information.

In some scenarios, on the redundancy node end, some logs of a production service may be ineffective because of some factors. Therefore, corresponding effective logs need to be re-obtained to restore the ineffective logs. The redundancy node may request to obtain the effective logs from the recording node, or may request to obtain the effective logs from the production node, which is specifically as follows:

The redundancy node sends a request message to the recording node or the production node, where the request message is used to request to obtain a to-be-restored log, and the to-be-restored log includes a log corresponding to a third sequence number, or includes a log corresponding to a sequence number greater than a fourth sequence number.

The redundancy node receives the to-be-restored log sent by the recording node or the production node, and restores a locally stored log of the first production service according to the to-be-restored log.

When the production node becomes faulty or the first production service becomes faulty, the redundancy node may further receive, according to a preset receive frequency, a connection request sent by the recording node, and establish a communication connection to the recording node according to the connection request, where the connection request includes location information of the production node.

To improve a probability of receiving from the recording node, that is, stability of the connection request, the preset receive frequency corresponding to a preset transmit frequency set for the recording node may be set, so that the redundancy node may receive, according to the preset receive frequency, the connection request sent by the recording node, where the connection request includes the location information of the production node, and the location information may be used by a system maintenance engineer to accurately locate the recording node. Node information of the production node that is equipped with the recording node can be determined according to the location information of the recording node, thereby reducing searching time. The connection request is sent according to a preset frequency. Therefore, a probability that the connection request is received by the redundancy node can be increased.

In addition, according to one embodiment, the redundancy node further determines, according to the location information, at least one of the following:

node information of the first production node that becomes faulty, node information of the production node to which the first production service belongs, or a process number of the first production service, where the node information includes a serial number and/or location information of the production node.

A fourth aspect of the present invention provides a recording node, having functions of implementing the disaster recovery switchover method provided in the foregoing first aspect. The functions may be implemented by using hardware, or may be implemented by executing corresponding software by hardware. The hardware or the software includes one or more modules corresponding to the foregoing functions. The module may be software and/or hardware.

In a possible design, the recording node is applied to a disaster recovery switchover system, the disaster recovery switchover system includes a production node and a redundancy node, the production node currently runs a first production service, and the recording node includes:

a receiving module, configured to receive first restoration information sent by the production node, where the first restoration information is information required for restoring the first production service to a latest running status of the first production service;

a processing module, configured to determine whether the first production service needs to be restored on the redundancy node; and a sending module, configured to send second restoration information to the redundancy node when the processing module determines that the first production service needs to be restored on the redundancy node, where the second restoration information is information that is obtained according to the first restoration information and that is required to restore the first production service on the redundancy node, so that the redundancy node switches the first production service to the redundancy node according to the second restoration information.

In a possible embodiment, the recording node is applied to a disaster recovery switchover system, the disaster recovery switchover system includes a production node and a redundancy node, the production node, the recording node, and the redundancy node are communicatively connected to each other, the production node currently runs a first production service, and the recording node includes:

at least one processor, memory, receiver, and transmitter; where the memory is configured to store program code, and the processor is configured to invoke the program code in the memory to perform the following operations:

receiving, by using the receiver, first restoration information sent by the production node, where the first restoration information is information required for restoring the first production service to a latest running status of the first production service;

determining whether the first production service needs to be restored on the redundancy node; and when determining that the first production service needs to be restored on the redundancy node, sending second restoration information to the redundancy node by using the transmitter, where the second restoration information is information that is obtained according to the first restoration information and that is required to restore the first production service on the redundancy node, so that the redundancy node switches the first production service to the redundancy node according to the second restoration information.

A fifth aspect of the present invention provides a production node, having functions of implementing the disaster recovery switchover method provided in the foregoing second aspect. The functions may be implemented by using hardware, or may be implemented by executing corresponding software by hardware. The hardware or the software includes one or more modules corresponding to the foregoing functions. The module may be software and/or hardware.

In a possible embodiment, the production node is applied to a disaster recovery switchover system, the disaster recovery switchover system further includes a recording node and the redundancy node, the production node currently runs a first production service, and the production node includes:

a processing module, configured to generate first restoration information corresponding to the first production service, where the first restoration information is information required for restoring the first production service to a latest running status of the first production service; and a sending module, configured to synchronize, to the recording node, the first restoration information generated by the processing module, so that the recording node sends, when determining that the first production service needs to be restored on the redundancy node, second restoration information to the redundancy node, and the redundancy node switches the first production service to the redundancy node according to the second restoration information, where the second restoration information is information that is obtained according to the first restoration information and that is required to restore the first production service on the redundancy node.

In a possible embodiment, the redundancy node includes:

at least one processor, memory, receiver, and transmitter; where the memory is configured to store program code, and the processor is configured to invoke the program code in the memory to perform the following operations:

generating first restoration information corresponding to the first production service, where the first restoration information is information required for restoring the first production service to a latest running status of the first production service; and synchronizing the generated first restoration information to the recording node by using the transmitter, so that the recording node sends, when determining that the first production service needs to be restored on the redundancy node, second restoration information to the redundancy node, and the redundancy node switches the first production service to the redundancy node according to the second restoration information, where the second restoration information is information that is obtained according to the first restoration information and that is required to restore the first production service on the redundancy node.

A sixth aspect of the present invention provides a redundancy node, having functions of implementing the disaster recovery switchover method provided in the foregoing third aspect. The functions may be implemented by using hardware, or may be implemented by executing corresponding software by hardware. The hardware or the software includes one or more modules corresponding to the foregoing functions. The module may be software and/or hardware.

In a possible embodiment, the redundancy node is applied to a disaster recovery switchover system, the disaster recovery switchover system further includes a production node and a recording node, the production node currently runs a first production service, and the redundancy node includes:

a receiving module, configured to receive second restoration information that is obtained according to the first restoration information and that is sent by the recording node, where the second restoration information includes information required for restoring the first production service on the redundancy node, and the first restoration information is information required for restoring the first production service to a latest running status of the first production service; and a processing module, configured to switch the first production service to the redundancy node according to the second restoration information received by the receiving module.

In a possible embodiment, the redundancy node includes:

at least one processor, memory, receiver, and transmitter; where the memory is configured to store program code, and the processor is configured to invoke the program code in the memory to perform the following operations:

receiving, by using the receiver, second restoration information that is obtained according to the first restoration information and that is sent by the recording node, where the second restoration information includes information required for restoring the first production service on the redundancy node, and the first restoration information is information required for restoring the first production service to a latest running status of the first production service; and switching the first production service to the redundancy node according to the second restoration information that is received by the receiver.

A seventh aspect of the present invention provides a disaster recovery switchover system, having functions of implementing the foregoing disaster recovery switchover method. The functions may be implemented by using hardware, or may be implemented by executing corresponding software by hardware. The hardware or the software includes one or more modules corresponding to the foregoing functions. The module may be software and/or hardware. The disaster recovery switchover system includes:

the recording node according to the fourth aspect, the production node according to the fifth aspect, and the redundancy node according to the sixth aspect.

In comparison with the prior art, in the solutions provided in the present invention, the recording node receives the first restoration information that is sent by the production node and that is information required for restoring the first production service to the latest running status of the first production service, and when determining that the first production service needs to be restored on the redundancy node, the recording node sends, to the redundancy node, the second restoration information that is obtained according to the first restoration information, so that the redundancy node switches the first production service to the redundancy node according to the second restoration information, to restore the first production service to a data time point before a disaster occurs on the production node, thereby implementing seamless service switchover, ensuring normal service running, improving stability of a production service, and effectively avoiding data loss caused when an unexpected disaster occurs on the production node.

DESCRIPTION OF EMBODIMENTS

Figure 1:
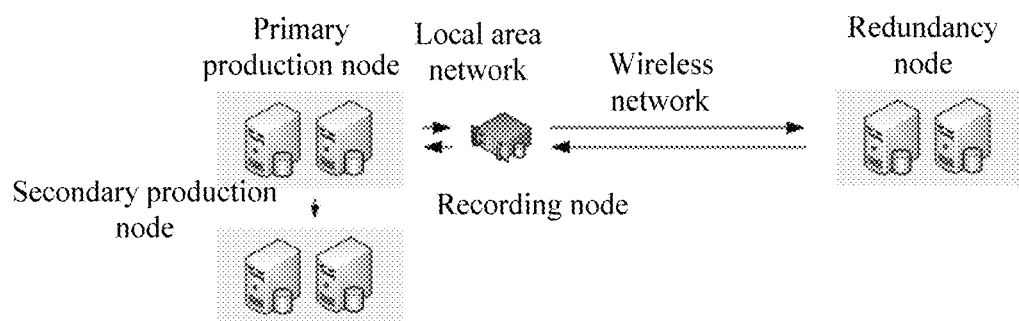
FIG. 1 is a schematic diagram of a networking structure of a disaster recovery switchover system according to an embodiment.

The following clearly and completely describes the technical solutions in the embodiments of the present invention with reference to the accompanying drawings in the embodiments of the present invention. Apparently, the described embodiments are a part rather than all of the embodiments of the present application. All other embodiments obtained by a person skilled in the art based on the embodiments of the present invention without creative efforts shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the data termed in such a way is interchangeable in proper circumstances so that the embodiments of the present invention described herein can be implemented in other orders than the order illustrated or described herein. Moreover, the terms "include" and "have" and any variants thereof are intended to cover a non-exclusive inclusion. For example, a process, a method, a system, a product, or a device that includes a series of steps or modules is not necessarily limited to those expressly listed steps or modules, but may include other steps or modules that are not expressly listed or inherent to such a process, a method, a product, or a device. In the specification, module division is merely logical division and may be other division during implementation in actual application. For example, multiple modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or other forms. This is not limited in the specification. In addition, the modules or submodules described as separate parts may or may not be physically separate, may or may not be physical modules, or may be distributed in multiple circuit modules. Some or all of the modules may be selected according to actual needs to achieve the objectives of the solutions in the embodiments of the present invention.

The embodiments of the present invention provide a disaster recovery switchover method and system, and a node, which are applied to the field of redundancy processing technologies, to resolve a problem of a data loss during a disaster recovery switchover in an existing mechanism. The following describes details.

The disaster recovery switchover system, in one embodiment, includes a production node, a redundancy node, and a recording node. The production node is communicatively connected to the recording node.

In one embodiment, the production node may be an office device on a local area network, a server, a control device, a test device on a production line, or the like; and the redundancy node may be a remote backup device performing data-level redundancy, application-level redundancy, and service-level redundancy for the production node.

The production node may run at least one production service. The production node includes a primary production node and a secondary production node, and the primary production node is communicatively connected to the secondary production node. The production node is communicatively connected to the recording node in mainly the following two manners:

a. The primary production node is communicatively connected to the recording node, for example, in a networking mode shown in FIG. 1. In the networking mode, the recording node is placed on the primary production node side, and the primary production node can directly interact with the recording node. The networking mode causes no loss of a differential log or differential data, can ensure integrity of the differential log or the differential data, and is applicable to a scenario in which a production service pressure is not high but a data reliability requirement is relatively high.

b. The secondary production node is communicatively connected to the recording node, for example, in a networking mode shown in FIG. 2. In the networking mode, the recording node is placed on the secondary production node side, so that the recording node can directly interact with the secondary production node, to back up a log and/or data of the secondary production node. The networking mode does not affect performance of the primary production node. However, the recording node cannot back up a differential log and/or differential data between the primary production node and the secondary production node. The networking mode is applicable to a scenario in which a production service pressure is relatively high and a distance between the primary production node and the production backup node is relatively short.

The foregoing two networking modes a and b may be selected according to a requirement of an actual application scenario. Certainly, another variant based on the networking modes of the present invention may exist, and the present invention imposes no limitation on a specific networking mode.

The redundancy node is configured to: remotely back up a log generated by the production node, production service data, and the like; and when the production node becomes faulty or a production service becomes faulty, switch to a production service before a fault occurs, so as to implement seamless service transition. The redundancy node includes a data differentiation component and a redundancy component. The redundancy component is a remote backup node of the production node and is mainly configured to: back up data of the production node, and switch the production service from the production node when the production node becomes faulty, so as to ensure normal running of the service.

The data differentiation component is mainly configured to: when the production node becomes faulty, implement interaction with the recording node deployed on the production node side, obtain required restoration information from the recording node, and then replay a differential log on the redundancy component end according to the restoration information, so that the redundancy component can switch the production service from the production node to the redundancy component, so as to ensure continuity and stability of the production service.

The recording node is a recording device that can record data generated by a device communicatively connected to the recording node. The recording node is communicatively connected to the primary production node, or is communicatively connected to the secondary production node, to implement real-time backup of the log generated by the production node, and ensure integrity of a differential log between the production node and the redundancy node.

In one embodiment of the present invention, the production node and the recording node are deployed at a same location, to ensure that low-latency communication can be implemented between the recording node and the production node. The "same location" in the embodiments of the present invention is a relative concept and means that a distance between a deployment location of the production node and that of the recording node may be shorter than a distance between the production node and the redundancy node. In this case, in a same network condition, network transmission costs between the production node and the recording node are much lower than network transmission costs between the production node and the redundancy node. Therefore, compared with a connection between the production node and the redundancy node, a low-cost, low-loss, and low-latency network connection can be established between the production node and the recording node. For example, the same location may mean that the recording node and the production node are deployed in a same cabinet, and the recording node may be connected to the production node in a high-speed manner by using PCIE (peripheral component interface express) or an optical cable; or the same location may mean that the recording node and the production node are located in a same equipment room, and an interface is introduced from a cabinet in which the production node is located, so that the production node is connected to the recording node in a high-speed manner by using a cable, an optical module, or the like. In some scenarios, the same location may mean that the production node and the recording node are separately located in equipment rooms that are next or near to each other in a same building, and the production node is communicatively connected to the recording node in a high-speed wired or wireless manner, for example, by using a cable, an optical module, or a WLAN (wireless local area network) network. The present invention imposes no limitation on a specific manner or protocol for implementing communication between the recording node and the production node, provided that low-latency communication can be implemented between the recording node and the production node. The recording node and the production node are deployed at the same location. When a disastrous event occurs, both the recording node and the production node are affected. Compared with the production node, the recording node is a device having higher disaster tolerance and cannot be easily damaged in the disastrous event. Therefore, when the production node becomes faulty or the production service becomes faulty, the recording node can continue to work and send the differential log to the redundancy node, to ensure integrity of a log of the redundancy node, that is, to ensure that a difference between a log of the production node and that of the redundancy node is minimized.

In addition, according to one embodiment, the recording node only needs to receive, store, and send the restoration information, with no need to independently run the production service. Therefore, a hardware structure of the recording node is greatly simplified in comparison with those of the production node and the redundancy node, and the recording node may be designed as a device that is highly integrated, small-sized, and easily deployed.

A high-stability recording device may be selected as the recording node in the present invention. The high-stability recording device is a device similar to a flight data recorder in air transportation and has extremely strong capabilities of withstanding shock and vibration, fire, pressure, seawater immersion, electromagnetic radiation, and the like. To some extent, it may be considered that the device provides absolute protection for data, and is not damaged by a factor such as a war or a natural disaster. Therefore, after being designed as the high-stability device, the recording node can have higher redundancy performance than the production node.

A wireless transceiver apparatus may be configured for the high-stability recording device. When a disaster occurs, all data of the high-stability recording device may be obtained by using a wireless network. In an extreme case, for example, during a network breakdown, it is possible that the data cannot be obtained. Therefore, a GPS (global positioning system) may be carried according to a specific case and a reliability requirement. GPS coordinates are continuously sent before the high-stability recording device attempts to communicate with an external component. After a signal is received by using the external component, a coordinate location of the high-stability recording device can be determined, thereby facilitating positioning and searching by rescue personnel. In addition, the recording node is highly integrated and small-sized. Therefore, compared with a device in a disaster recovery switchover system in an existing mechanism, even though the recording node is damaged, the recording node can be recycled without a large quantity of labor and material resources.

If there is still a doubt about reliability of the high-stability device, intra-city redundancy may further be considered for the high-stability device. In an extreme scenario, a damaged high-stability device may further be recovered by using another high-stability device.

To resolve the foregoing technical problems, the embodiments of the present invention mainly provide the following technical solutions:

1. The production node sends the generated log to the recording node for storage, so that the generated log is subsequently used as restoration information to offset the differential log between the production node and the redundancy node.

2. When determining that the production node becomes faulty or the production service becomes faulty, the recording node sends, to the redundancy node, restoration information corresponding to the production service, and the redundancy node switches to the corresponding production service according to the restoration information.

In the foregoing technical solutions, with reference to a mechanism for replaying a sequence number and a time point of a log, a data loss between the production node and the redundancy node because of asynchronous and synchronous delays can be offset, so as to ensure that differential data can be restored by using the recording node when a disaster occurs. Therefore, the redundancy node can restore the production service to a data time point before the disaster occurs on the production node, to implement seamless switchover transition. An RPO approximates to 0, thereby effectively avoiding the data loss caused when an unexpected disaster occurs on the production node.

In one embodiment of the present invention, data recovery of the redundancy node is implemented by using restoration information. Specifically, the redundancy node runs a production service, and when recovery needs to be performed, restores, by using the restoration information, the production service on the redundancy node to a latest running status of the production service that is run on the production node, so as to take the place of the production node to run a production service that is restored. With reference to the prior art, the restoration information may be implemented by using multiple existing technologies. For example, in an incremental backup manner, incremental data is used as the restoration information, and when data recovery is performed, a generated service can be restored according to original data and the incremental data. In a log manner, a log generated when the production node runs a production service is used as the restoration information, and when data recovery is performed, the redundancy node performs a data operation on the production service according to a corresponding log, to restore the production service. For ease of description, a log is used as restoration information hereinafter in the embodiments of the present invention. However, it may be understood that a person skilled in the art may also use another form in the prior art as restoration information with reference to these embodiments, so as to achieve the inventive objectives of the present invention.

Figure 2:
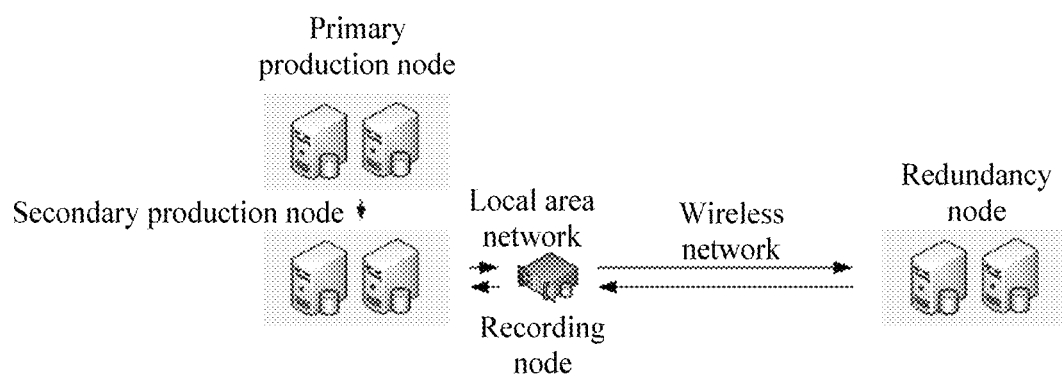
FIG. 2 is a schematic diagram of another networking structure of a disaster recovery switchover system according to an embodiment.
Figure 3:
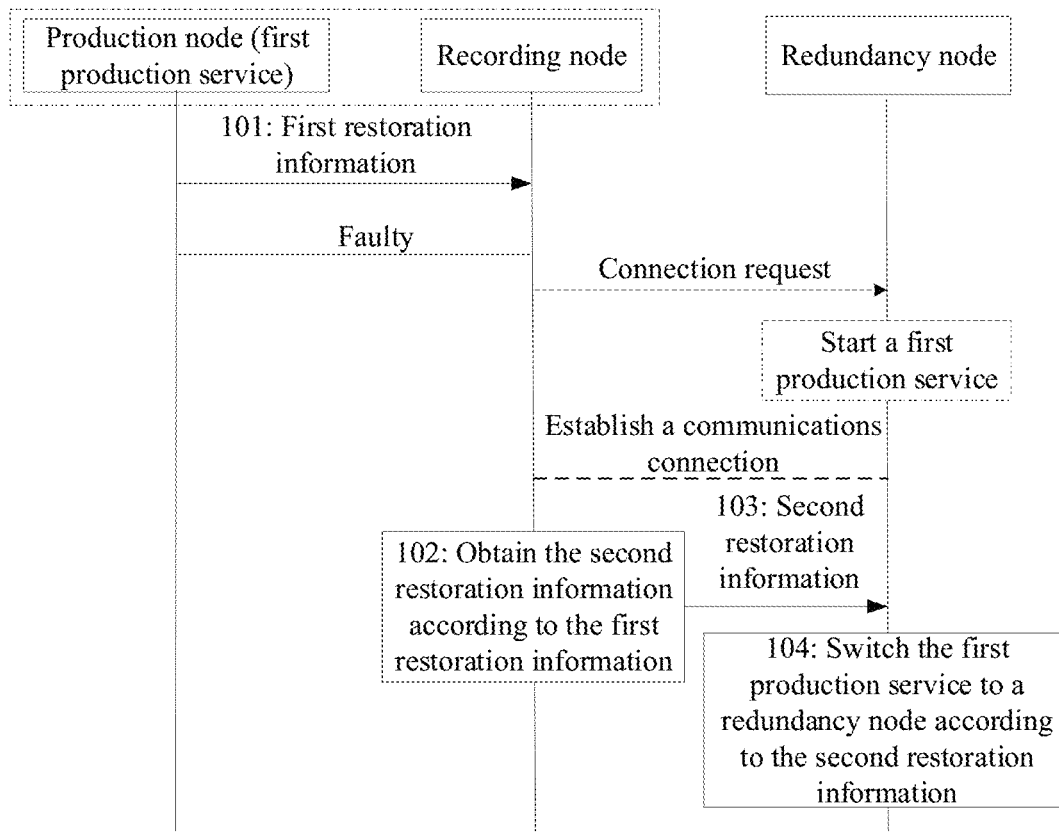
FIG. 3 is a schematic signaling interworking diagram of a disaster recovery switchover method according to an embodiment.

Referring to FIG. 3, based on the two networking modes in FIG. 1 and FIG. 2, the following uses an example to describe a disaster recovery switchover method provided in the present invention. A cluster management monitor is pre-deployed on a production node, a recording node, and a redundancy node. The cluster management monitor may monitor nodes in an entire cluster and services running on the nodes, for example, may detect whether a node and/or a service becomes faulty. The cluster management monitor may be a monitor application deployed on the production node, the recording node, and the redundancy node. This embodiment of the present invention may be applied to a disaster recovery switchover system. The disaster recovery switchover system includes a production node, a redundancy node, and a recording node. According to different networking modes of the production node, the redundancy node, and the recording node, the production node may directly send a generated log to the redundancy node, to implement backup (the production node, the recording node, and the redundancy node may be communicatively connected to each other), or may forward a generated log to the redundancy node by using the recording node (the production node may or may not communicate with the redundancy node). The production node currently runs a first production service. The method includes the following operations.

Operation 101. The production node sends first restoration information to the recording node.

The first restoration information is information required for restoring the first production service to a latest running status of the first production service. The first restoration information may include a log, an event, or the like that can record process instance information during running of the first production service, and may be generated in a snapshot form. The present invention imposes no limitation on a specific type and recording manner of the first restoration information.

Operation 102. The recording node receives the first restoration information sent by the production node.

Operation 101 and operation 102 are a process of synchronizing the first restoration information between the production node and the recording node. The synchronization process may be implemented in an asynchronous transfer mode (reference may be made to an embodiment corresponding to FIG. 4) or a synchronous transfer mode (reference may be made to an embodiment corresponding to FIG. 5).

Operation 103. When determining that the first production service needs to be restored on the redundancy node, the recording node sends second restoration information to the redundancy node.

The second restoration information is information that is obtained according to the first restoration information and that is required to restore the first production service on the redundancy node. The second restoration information may be obtained in a manner such as packaging or transforming multiple pieces of the first restoration information. The present invention imposes no limitation on a specific manner and information type.

Whether the first production service needs to be restored on the redundancy node may be determined by monitoring the deployed monitor application. For example, a fault of the production node or the first production service, or the like is detected. Alternatively, the production service may proactively request (possibly because current heavy load, a warning, or the like is detected) to restore the first production service on the redundancy node. Alternatively, communication with the production node may be disconnected.

In one embodiment, if the recording node merely performs incremental backup on the log generated by the production node, instead of forwarding the log as a relay, and if the first production service becomes faulty or the production node becomes faulty, the recording node further establishes a communication connection to the redundancy node by sending a connection request, so that the redundancy node starts the first production service according to the connection request. Then, the recording node sends a differential log of the redundancy node relative to the production node to the redundancy node, so that the redundancy node can replay the log, and the first production service can be restored on the redundancy node. It may be understood that, when determining that the first production service needs to be restored on the redundancy node, the recording node may automatically serve as a signal transceiver and may send a signal to the outside.

In one embodiment, to improve a probability that the connection request is received by the redundancy node, the recording node may further send the connection request according to a preset transmit frequency. To reduce faulty production nodes located by a maintenance engineer, the connection request may further include location information of the production node. The location information is used by the redundancy node to determine at least one of the following:

node information of the production node that becomes faulty, node information of the production node to which the first production service belongs, or a process number of the first production service.

The node information includes a serial number and/or location information of the production node.

A system maintenance engineer can accurately locate the recording node by using the location information of the production node. Node information of the production node that is equipped with the recording node can be determined according to the location information of the recording node, thereby improving searching efficiency. Correspondingly, an operation such as maintenance and adjustment can be performed on the located production node, thereby ensuring normal running of a production service, and avoiding interruption of the production service.

In addition, when starting the first production service, the redundancy node may not access a service of the first production service until the first production service is subsequently restored according to the received second restoration information in operation 104.

In an actual application scenario, to further reduce a data processing volume, a loss of differential data, and synchronization efficiency of the disaster recovery switchover system, real-time synchronization can be implemented in a manner of synchronizing a log, and system performance of the entire disaster recovery switchover system is not affected by a large amount of data that needs to be synchronized. Therefore, the second restoration information may include at least one first log. The first log is a log that is generated when the production node runs the first production service before becoming faulty and that is not stored in the redundancy node.

In addition, to increase a speed of identifying, by the redundancy node, a log that needs to be backed up, the second restoration information may further carry a first sequence number corresponding to the first log. The first sequence number may be used to determine a generation sequence of the first log on the production node. Log sequence numbers are usually arranged in ascending order according to a log generation sequence. For example, logs of the first production service include a log 1, a log 2, a log 3, . . . , and a log n. Generation times of the log 1, the log 2, the log 3, . . . , and the log n are arranged in ascending order from left to right.

It may be understood that the first log may be a log set, stored in the recording node, of the first production service, and correspondingly, the first sequence number is a sequence number set corresponding to the log set. Alternatively, the first log may be any log in a log set, and correspondingly, the first sequence number is a sequence number corresponding to the any log. That is, the recording node may send the sequence number set and the log set to the redundancy node at a time, or may send, to the redundancy node in an order of log sequence numbers, one sequence number and one log corresponding to the sequence number each time. This embodiment of the present invention imposes no limitation on a specific order of sending a log and a sequence number corresponding to the log. In principle, the sequence number and the corresponding log are sent in the order of log sequence numbers, so that the redundancy node performs comparison according to the order.

For example, according to the order of log sequence numbers, the recording node first sends the log 1 and a sequence number of the log 1 to the redundancy node, then sends the log 2 and a sequence number of the log 2 to the redundancy node, . . . , and finally sends the log n and a sequence number of the log n to the redundancy node. For another example, the recording node sends the log 1, the log 2, the log 3, . . . , and the log n and a sequence number of the log 1, a sequence number of the log 2, . . . , and a sequence number of the log n to the redundancy node.

Operation 104. The redundancy node receives the second restoration information sent by the recording node, and switches the first production service to the redundancy node according to the second restoration information.

Switching the first production service to the redundancy node according to the second restoration information indicates that the redundancy node already restores, on the redundancy node end, the differential log between the redundancy node and the production node. Therefore, the redundancy node can access the service of the first production service, thereby implementing seamless switchover of the service, ensuring normal running of the service, and improving stability of the production service.

In a synchronous replication mode of an existing mechanism, to ensure disaster tolerance of a redundancy system, when data is synchronized to a remote redundancy system that is relatively far away, performance of the redundancy system is degraded because of network latency. In comparison with the synchronous replication mode of the existing mechanism, in the present invention, the recording node deployed at the same location with the production node is used to synchronously back up characteristics of the first restoration information, so as to ensure restoration information consistency between the production node and the recording node. When a first production service needs to be restored subsequently, the recording node can provide the redundancy node with the second restoration information, so that data of the redundancy node is consistent with that of the production node, and the first production service can be restored to the latest running status on the redundancy node. In comparison with an existing synchronization mechanism, the production node only needs to be consistent with the recording node, but does not need to be consistent with the redundancy node. The recording node and the production node are deployed at the same location, so that the network latency is reduced, thereby avoiding a problem of performance degradation caused in the synchronous replication mode. In addition, in the synchronous replication mode of the existing mechanism, to ensure the disaster tolerance of the redundancy system, a high-speed network device is required to synchronize data with the remote redundancy system to ensure data consistency. However, the performance of the redundancy system is affected. In the present invention, the recording node deployed at the same location with the production node is used to synchronously back up the first restoration information, and the recording node provides the redundancy node with characteristics of the second restoration information. Without a high-speed network device, data consistency between the production node and the redundancy node can still be ensured.

In an asynchronous replication mode of the existing mechanism, when data is backed up to the remote redundancy system, there is a relatively large data difference between the production node and the redundancy node because of network latency. In the present invention, the recording node deployed at the same location with the production node is used to synchronously back up the characteristics of the first restoration information, and a transmission rate of the first restoration information can be ensured without considering the network latency, thereby ensuring restoration information consistency between the production node and the recording node. When the first production service needs to be restored subsequently, the recording node can provide the redundancy node with the second restoration information, so that data of the redundancy node is consistent with that of the production node, and performance of the production node can be ensured.

It can be learned that, in an embodiment of the present invention, system performance of the production node can be ensured, no loss of differential restoration information between the production node and the redundancy node can be ensured, and the first production service can be restored on the redundancy node end to a data time point before a disaster occurs on the production node, thereby implementing seamless service switchover, ensuring normal service running, improving stability of a production service, and effectively avoiding data loss caused when an unexpected disaster occurs on the production node.

Optionally, in some embodiments of the present invention, when the second restoration information includes at least one first log, the redundancy node may identify the differential log between the redundancy node and the production node by means of log generation sequence comparison. A process of receiving, by the redundancy node, the second restoration information sent by the recording node, and switching the first production service to the redundancy node according to the second restoration information is as follows:

The recording node sends the second restoration information to the redundancy node, so that the redundancy node receives and stores the at least one first log in the second restoration information, and then switches the started first production service to a target running status according to a generation sequence of the first log. The target running status is a running status, corresponding to a first log with a latest generation time in the at least one first log, of the first production service. Therefore, the redundancy node can rapidly identify, according to the generation sequence of the first log, the at least one first log that is not stored, unnecessary log receiving is reduced, and disaster recovery switchover efficiency is improved.

Specifically, a process of receiving and storing, by the redundancy node, the at least one first log in the second restoration information is as follows:

After receiving the first sequence number and the first log, the redundancy node determines the generation sequence of the first log on the production node according to the first sequence number, and then compares the first sequence number with a sequence number of a latest log stored in the redundancy node. The generation sequence may be determined according to a sequence number encoding rule, for example, by means of sequence number comparison.

When determining that the first sequence number is greater than the sequence number of the latest log, the redundancy node obtains and stores a log whose sequence number is greater than the first sequence number in the first log. It may be understood that, when the first sequence number is less than the sequence number of the latest log, it indicates that the redundancy node already synchronizes a log corresponding to the first sequence number; or when the first sequence number is the same as the sequence number of the latest log, the redundancy node already synchronizes a log whose sequence number is less than the first sequence number.

The redundancy node switches the started first production service to a target running status according to the log whose sequence number is greater than the first sequence number. The target running status is a running status corresponding to a latest log in the log whose sequence number is greater than the first sequence number, and the target running status may or may not be the latest running status of the first production service on the production node.

Only the log whose sequence number is greater than the first sequence number may be received by comparing the log sequence numbers, to implement receiving of only the differential log between the redundancy node and the production node, without receiving a synchronized log and identifying the differential log, thereby reducing a disaster recovery switchover delay caused because after all logs of the first production service are received, a differential log needs to be further identified. In addition, seamless switchover service transition can be implemented, and it can be ensured that the first production service is not interrupted.

In some application scenarios, the redundancy node includes a data differentiation component and a redundancy component, and an entire disaster recovery switchover procedure is as follows:

receiving, by the data differentiation component in the redundancy node, the first sequence number and the first log that are sent by the recording node;

comparing, by the data differentiation component in the redundancy node, the first sequence number with the sequence number of the latest log stored in the redundancy node;

when determining that the first sequence number is greater than the sequence number of the latest log, obtaining and storing, by the data differentiation component in the redundancy node, the log whose sequence number is greater than the first sequence number in the first log, and storing the log whose sequence number is greater than the first sequence number to a cache of the redundancy component; and switching, by the redundancy component in the redundancy node, the started first production service to a target running status according to the log whose sequence number is greater than the first sequence number, where the target running status is the running status corresponding to the latest log in the log whose sequence number is greater than the first sequence number, and the target running status may or may not be the latest running status of the first production service on the production node.

Figure 4:
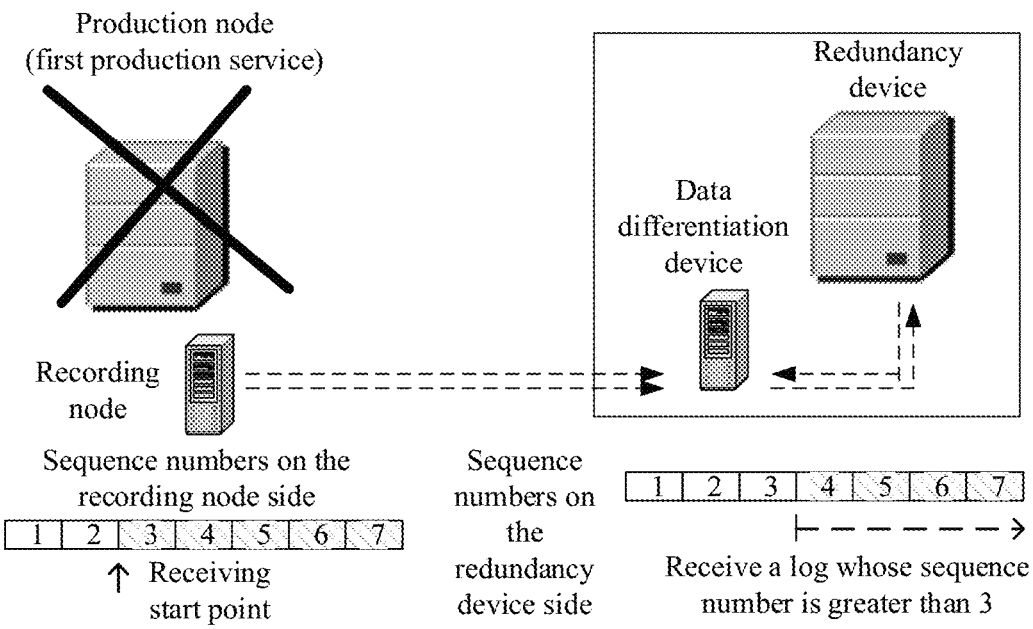
FIG. 4 is a schematic diagram of an embodiment of a disaster recovery switchover method according to an embodiment.

That the recording node successively sends a sequence number and a log in the order of log sequence numbers is used as an example below. As shown in FIG. 4, logs, locally stored in the recording node, of the first production service include a log 1, a log 2, . . . , and a log 7. Generation times of the log 1, the log 2, . . . , and the log 7 are arranged in ascending order from left to right, and log sequence numbers are successively 1, 2, 3, . . . , and 7. Logs, locally stored in the redundancy component, of the first production service include a log 1, a log 2, and a log 3, and log sequence numbers are successively 1, 2, and 3.

The recording node first sends the log 1 and the sequence number 1 to the data differentiation component, and the data differentiation component compares the received sequence number 1 with the sequence numbers 1, 2, and 3 locally recorded in the data differentiation component. If the sequence number 1 locally recorded in the data differentiation component is the same as the sequence number 1, and both the sequence number 2 and the sequence number 3 are greater than the sequence number 1, it indicates that the log 1 corresponding to the sequence number 1 is already backed up in the data differentiation component, and the data differentiation component discards the log 1 sent by the recording node. Likewise, the recording node sends the log 2 and the sequence number 2 to the data differentiation component, and the log 2 is discarded by means of comparison. By means of comparison, the sequence number 3 locally recorded in the data differentiation component is the same as the sequence number 3, and the log 3 is also discarded. By means of comparison, if the received sequence number 4 is greater than the sequence number 3 locally recorded in the data differentiation component, it indicates that the data differentiation component has not backed up the log 4 corresponding to the sequence number 4. In this case, the sequence number 3 may be used as a receiving start point, and logs corresponding to all sequence numbers that are greater than the sequence number 3 are received. That is, the data differentiation component receives the log 4, the log 5, the log 6, and the log 7. After being received, the log 4, the log 5, the log 6, and the log 7 are stored in the redundancy component in an incremental storage manner.

Optionally, in some embodiments of the present invention, when the production node runs normally or the first production service runs normally, the first production service that is run on the production node generates corresponding operation data. The production node records the operation data by using a log, and then sends the recorded log to the recording node and the redundancy node, so as to implement synchronous backup. Synchronous backup of a log between the production node and the recording node mainly includes an asynchronous transfer mode and a synchronous transfer mode. That the first restoration information includes a second log is used as an example below, to separately describe the asynchronous transfer mode used to implement the synchronous backup and the synchronous transfer mode used to implement the synchronous backup.

1. Implementing the Synchronous Backup in the Asynchronous Transfer Mode:

The production node generates the second log, performs a data operation corresponding to the second log, sends the second log to the recording node, and then may further send, to the recording node, a log whose generation time is later than that of the second log. Correspondingly, after receiving the second log sent by the production node, the recording node soon receives restoration information that is sent by the production node and whose generation time is later than that of the first log. In the asynchronous transfer mode, data backup efficiency can be improved, and system stability can be improved.

In the asynchronous transfer mode, the production node does not need to wait for a synchronization response returned by the recording node, but can directly send, to the redundancy node, the second log sent to a cache queue, and can send a log subsequent to the second log to the recording node. It should be noted that the second log in this embodiment of the present invention is a log synchronized to the redundancy node in real time by means of synchronous backup and is different from the first log.

Figure 5:
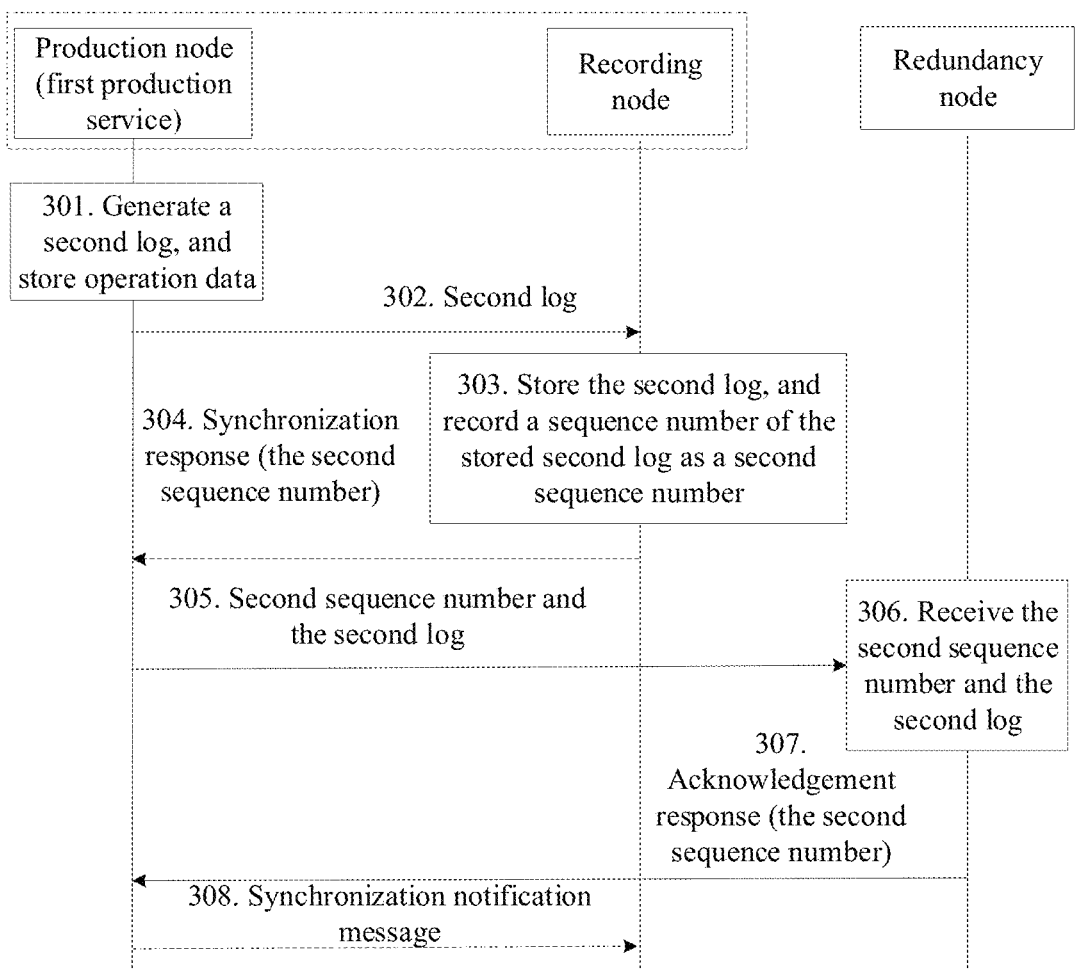
FIG. 5 is a schematic diagram of another embodiment of a disaster recovery switchover method according to an embodiment.

As shown in FIG. 5, after generating the second log, the production node locally stores the second log, and then sends the second log to the recording node. A synchronous backup procedure is as follows:

Operation 301. The production node generates the second log when performing a transaction operation in the first production service, and stores operation data corresponding to the second log (or which is understood as performing a data operation corresponding to the second log, for example, a persistency operation).

Operation 302. The production node sends the second log to the recording node.

Operation 303. After receiving the second log that is sent by the production node and that is generated when the first production service is run, the recording node stores the second log in the order of log sequence numbers, and records a sequence number of the stored second log as a second sequence number.

Operation 304. The recording node sends, to the production node, a synchronization response carrying the second sequence number.

The synchronization response is used to indicate that a latest sequence number of a log, currently stored in the recording node, of the first production service is already updated to the second sequence number, that is, the synchronization response is a synchronization response for the production node.

Operation 305. After receiving the synchronization response sent by the recording node, the production node sends the second log and the second sequence number to the redundancy node.

It may be understood that regardless of whether the production node receives the synchronization response, the production node may continue to perform the operation of sending the second log and the second sequence number to the redundancy node in step 305, and continue to perform the operation of sending the log to the recording node in step 302, provided that all logs sent subsequently are logs whose generation times are later than that of the second log. The present invention imposes no limitation on a time sequence of the operations in operations 301 and 305.

Operation 306. The redundancy node receives the second log sent by the production node.

Operation 307. The redundancy node sends, to the production node, an acknowledgement response carrying the second sequence number.

Operation 308. The production node sends a synchronization acknowledgement message to the recording node, to notify the recording node that the redundancy node already completes remote backup of the second log, where the synchronization acknowledgement message may further include the second sequence number, to indicate that a latest log currently stored in the redundancy node is the second log. The notification message may include a field used to identify the second sequence number, so that the recording node can check a locally stored latest log according to the field, to ensure accuracy of real-time log synchronization between the production node, the redundancy node, and the recording node.

After receiving the synchronization acknowledgement message sent by the production node, the recording node continues to receive a new log sent by the production node.

Like the description in operation 305, the recording node does not need to wait for the synchronization acknowledgement message, but can continuously receive new logs sent by the production node.

2. Implementing the Synchronous Backup in the Synchronous Transfer Mode:

After the recording node receives the second log sent by the production node, the recording node sends a synchronization response to the production node, where the synchronization response is used to notify the production node of the second log currently updated in the recording node. After receiving the synchronization response returned by the recording node, the production node performs a data operation corresponding to the second log, and sends the second log to the redundancy node. Then, the recording node receives restoration information that is sent by the production node and whose generation time is later than that of the first restoration information.

It can be learned that in the synchronous transfer mode, only after receiving a synchronization response returned by the recording node, the production node can send, to the redundancy node, the second log sent to a cache queue, and then send a log subsequent to the second log in the cache queue to the recording node, and it goes round in circles. In the synchronous transfer mode, no data loss can be ensured, and data stability can be improved.

Figure 6:
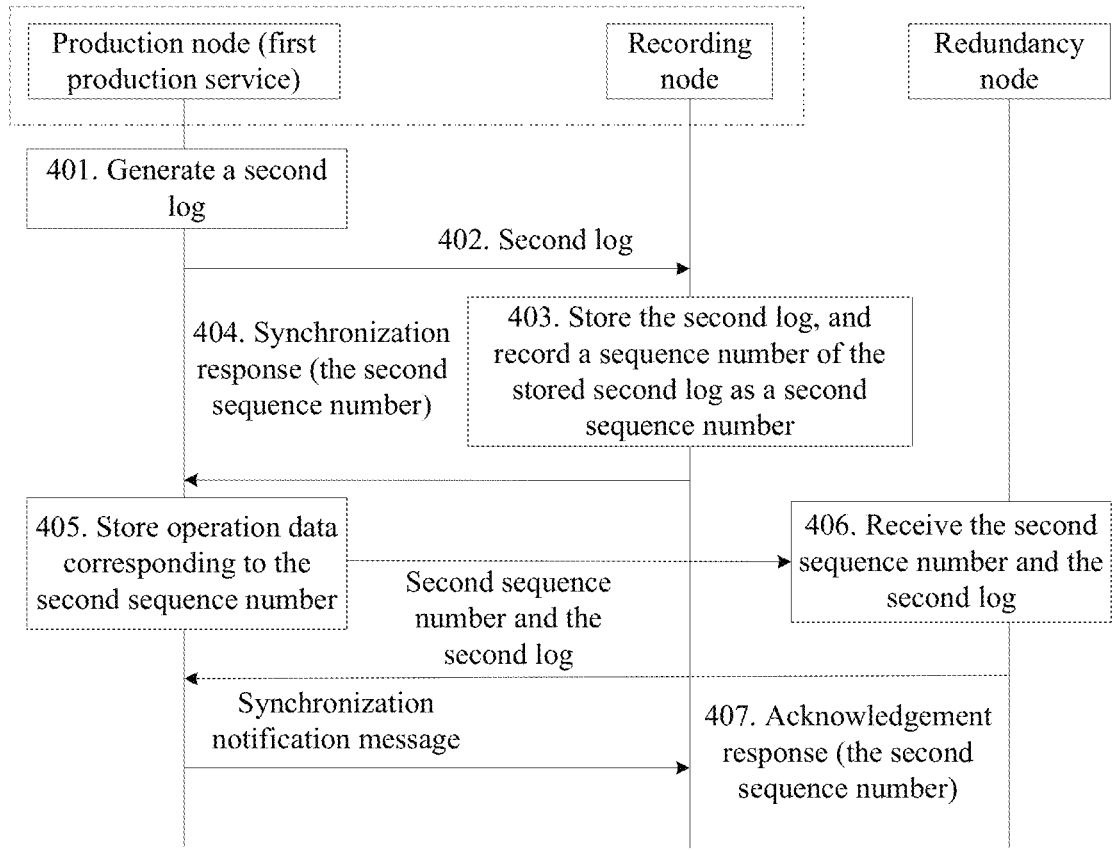
FIG. 6 is a schematic diagram of another embodiment of a disaster recovery switchover method according to an embodiment.

As shown in FIG. 6, a synchronous backup procedure is as follows:

Operation 401. The production node generates the second log when performing a transaction operation in the first production service.

Operation 402. The production node sends the second log to the recording node.

Operation 403. The recording node receives and stores the second log sent by the production node.

The second log is a log generated when the production node runs the first production service. The recording node may store the second log in the order of log sequence numbers and record a sequence number of the stored second log as a second sequence number.

Operation 404. The recording node sends, to the production node, a synchronization response carrying the second sequence number.

Operation 405. The production node stores operation data corresponding to the second sequence number (or which is understood as performing a data operation corresponding to the second log, for example, a persistency operation), and sends the second log and the second sequence number to the redundancy node.

Operation 406. The redundancy node receives the second log sent by the production node.

Operation 407. The redundancy node sends, to the production node, an acknowledgement response carrying the second sequence number.

Only after operations 401 to 405 are complete, the production node can continue to send, to the recording node, a log that is in the cache queue and whose sequence number is greater than the second sequence number.

In the foregoing embodiments corresponding to FIG. 5 and FIG. 6, after the recording node sends the second sequence number to the production node, the production node may further send a notification message to the recording node. The notification message is used to indicate that synchronization between a log stored in the production node and a log stored in the redundancy node is complete, so that the recording node checks synchronization information. Each time synchronous backup is complete by using the recording node, a log stored in the recording node may be deleted, and the recording node writes the log in a cyclic manner, so as to ensure no loss of a differential log between the production node and the redundancy node.

Optionally, in some embodiments of the present invention, in an actual application scenario, the redundancy node can implement log replay by means of synchronous backup. However, some logs of a production service may be ineffective because of some factors. Therefore, corresponding effective logs need to be re-obtained to restore the ineffective logs. The redundancy node may request to obtain the effective logs from the recording node, or may request to obtain the effective logs from the production node. A specific process is as follows:

The redundancy node sends a request message to the recording node or the production node, to request to obtain a to-be-restored log, where the request message may carry a sequence number of the to-be-restored log, the sequence number may be a sequence number of a single log, a sequence number of a log whose generation time is the earliest in the to-be-restored log, or multiple sequence numbers. Correspondingly, the to-be-restored log includes a log corresponding to a sequence number, or includes a log corresponding to a sequence number greater than a sequence number.

After receiving the request message sent by the redundancy node or the production node, the recording node sends the to-be-restored log to the redundancy node, so that the redundancy node restores a locally stored log of the first production service according to the to-be-restored log, that is, locally replaying the log.

The foregoing describes the disaster recovery switchover method in the present invention. The following separately describes a recording node, a production node, a redundancy node, and a disaster recovery switchover system that perform the foregoing disaster recovery switchover. The disaster recovery switchover system includes the production node, the redundancy node, and the recording node. The production node currently runs a first production service.

Figure 7:
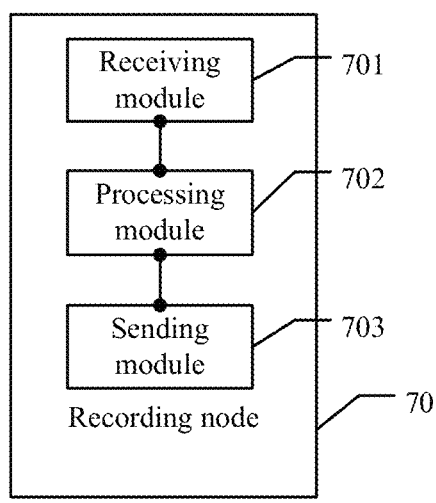
FIG. 7 is a schematic structural diagram of a recording node according to an embodiment.

1. Referring to FIG. 7, a recording node 70 is described. The recording node 70 includes:

a receiving module 701, configured to receive first restoration information sent by the production node, where the first restoration information is information required for restoring the first production service to a latest running status of the first production service;

a processing module 702, configured to determine whether the first production service needs to be restored on the redundancy node; and a sending module 703, configured to send second restoration information to the redundancy node when the processing module 702 determines that the first production service needs to be restored on the redundancy node, where the second restoration information is information that is obtained according to the first restoration information and that is required to restore the first production service on the redundancy node, so that the redundancy node switches the first production service to the redundancy node according to the second restoration information.

In this embodiment of the present invention, the receiving module 701 receives the first restoration information sent by the production node, when the processing module 702 determines that the first production service needs to be restored on the redundancy node, the sending module 703 sends, to the redundancy node, the second restoration information that is obtained according to the first restoration information, so that the redundancy node switches the first production service to the redundancy node according to the second restoration information, to restore the first production service to a data time point before a disaster occurs on the production node, thereby implementing seamless service switchover, ensuring normal service running, improving stability of a production service, and effectively avoiding data loss caused when the disaster occurs on the production node.

Optionally, in some embodiments, the second restoration information includes at least one first log. The first log is a log that is generated when the production node runs the first production service before becoming faulty and that is not stored in the redundancy node. Log sequence numbers may be arranged in ascending order according to a log storage sequence. Optionally, the second restoration information further includes a sequence number corresponding to the first log. The sequence number is used to determine a generation sequence of the first log on the production node.

The processing module 702 is configured to:

send the second restoration information to the redundancy node by using the sending module 702, so that the redundancy node receives and stores the at least one first log in the restoration information, and switches the started first production service to a target running status according to the generation sequence of the first log, where the target running status is a running status, corresponding to a first log with a latest generation time in the at least one first log, of the first production service.

Specifically, the sending module 702 sends a first sequence number and the first log to the redundancy node, so that the redundancy node compares the first sequence number with a sequence number of a latest log stored in the redundancy node, and receives and stores, when determining that the first sequence number is greater than the sequence number of the latest log, a log whose sequence number is greater than the first sequence number in the first log, and switches the started first production service to a target running status according to the log whose sequence number is greater than the first sequence number, where the target running status is a running status corresponding to a latest log in the log whose sequence number is greater than the first sequence number.

Optionally, in some embodiments, the recording node 70 further includes the receiving module 703, and the processing module 701 needs to restore the first production service on the redundancy node, which includes one of the following:

detecting that a communication connection to the production node becomes faulty; or receiving, by using the receiving module 703, a second message used to indicate that the production node becomes faulty or indicate that the first production service becomes faulty.

Optionally, in some embodiments, after the receiving module 701 receives the first restoration information sent by the production node, the processing module 702 may further be configured to send, to the production node by using the sending module 703, a synchronization response corresponding to the first restoration information. The synchronization response is used to notify the production node that latest restoration information currently stored in the recording node is the first restoration information.

Optionally, in some inventive embodiments, after a second sequence number is sent to the production node, the processing module 702 is further configured to:

receive, by using the receiving module 701, a synchronization acknowledgement message sent by the production node, where the synchronization acknowledgement message is used to indicate that synchronization between a log stored in the production node and a log stored in the redundancy node is complete.

Optionally, in some embodiments, the processing module 702 is further configured to:

receive, by using the receiving module 701, a request message sent by the redundancy node, where the request message is used to request to obtain a to-be-restored log, the request message may carry a sequence number of the to-be-restored log, and the sequence number may be a sequence number of a single log, a sequence number of a log whose generation time is the earliest in the to-be-restored log, or multiple sequence numbers. Correspondingly, the to-be-restored log includes a log corresponding to a sequence number, or includes a log corresponding to a sequence number greater than a sequence number.

Then, the sending module 703 sends the to-be-restored log to the redundancy node, so that the redundancy node restores a locally stored log of the first production service according to the to-be-restored log.

Optionally, in some embodiments, before the recording node sends, after determining that the first production service needs to be restored on the redundancy node, the second restoration information to the redundancy node, the processing module 702 is further configured to:

send a connection request to the redundancy node by using the sending module 703, where the connection request is used to instruct the redundancy node to start the first production service; and control the recording node to establish a communication connection to the redundancy node.

Optionally, to improve a probability that the connection request is received by the redundancy node, the connection request may be sent according to a preset transmit frequency. Further, to reduce searching time that a maintenance engineer locates the recording node, the sent connection request may further carry location information of the production node.

The location information is used by the redundancy node to determine at least one of the following:

node information of the production node that becomes faulty, node information of the production node to which the first production service belongs, or a process number of the first production service.

The node information includes a serial number and/or location information of the production node.

Figure 8:
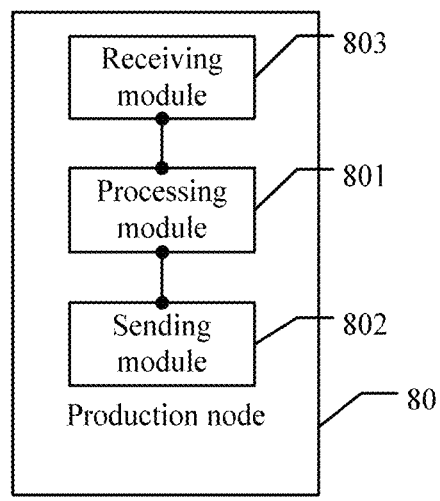
FIG. 8 is a schematic structural diagram of a production node according to an embodiment.

2. Referring to FIG. 8, a production node 80 is described. The production node 80 includes:

a processing module 801, configured to generate first restoration information corresponding to the first production service, where the first restoration information is information required for restoring the first production service to a latest running status of the first production service; and a sending module 802, configured to synchronize, to the recording node, the first restoration information generated by the processing module 801, so that the recording node sends, when determining that the first production service needs to be restored on the redundancy node, second restoration information to the redundancy node, and the redundancy node switches the first production service to the redundancy node according to the second restoration information, where the second restoration information is information that is obtained according to the first restoration information and that is required to restore the first production service on the redundancy node.

The second restoration information includes at least one first log. The first log is a log that is generated when the production node runs the first production service before becoming faulty and that is not stored in the redundancy node.

Optionally, the second restoration information may further include a sequence number corresponding to the first log. The sequence number is used to determine a generation sequence of the first log on the production node.

Optionally, in some inventive embodiments, the production node further includes a receiving module 803. Synchronous backup of a differential log between the production node 80 and the recording node 70 is mainly implemented in an asynchronous transfer mode or a synchronous transfer mode.

In the asynchronous transfer mode: The processing module 801 generates a second log, performs a data operation corresponding to the second log, sends the second log to the recording node by using the sending module 802, then sends the second log to the redundancy node by using the sending module 802, and sends, to the recording node, a log whose generation time is later than that of the second log. In a subsequent synchronization process, the production node 80 further receives, by using the receiving module 803, a synchronization response returned by the recording node, where the synchronization response is used to notify the production node of the second log currently updated in the recording node.

In the synchronous transfer mode: The processing module 801 generates the second log, sends the second log to the recording node by using the sending module 802, and then may further send, to the recording node, a log whose generation time is later than that of the second log.

Figure 9:
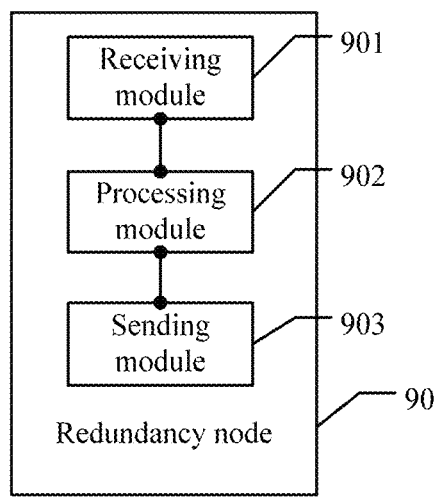
FIG. 9 is a schematic structural diagram of a redundancy node according to an embodiment.

3. Referring to FIG. 9, a redundancy node 90 is described. The redundancy node 90 includes:

a receiving module 901, configured to receive second restoration information that is sent by the recording node and that is obtained according to first restoration information, where the second restoration information is information required for restoring the first production service on the redundancy node, and the first restoration information is information required for restoring the first production service to a latest running status of the first production service; and a processing module 902, configured to switch the first production service to the redundancy node according to the second restoration information received by the receiving module 901.

In this embodiment of the present invention, after the receiving module 901 receives the second restoration information sent by the recording node, the processing module 902 switches the first production service to the redundancy node according to the second restoration information, to restore the first production service to a data time point before a disaster occurs on the production node, thereby implementing seamless service switchover, ensuring normal service running, improving stability of a production service, and effectively avoiding data loss caused when an unexpected disaster occurs on the production node.

Optionally, in some embodiments, the second restoration information includes at least one first log, and the first log is a log that is generated when the production node runs the first production service before becoming faulty and that is not stored in the redundancy node.

The processing module 902 is configured to:

receive and store the at least one first log in the second restoration information by using the receiving module 901, and switch the started first production service to a target running status according to a generation sequence of the first log, where the target running status is a running status, corresponding to a first log with a latest generation time in the at least one first log, of the first production service.

Specifically, after the receiving module 901 receives a first sequence number and the first log, the first sequence number is compared with a sequence number of a latest log stored in the redundancy node.

When determining that the first sequence number is greater than the sequence number of the latest log, the redundancy node obtains and stores a log whose sequence number is greater than the first sequence number in the first log, and switches the started first production service to a target running status according to the log whose sequence number is greater than the first sequence number, where the target running status is a running status corresponding to a latest log in the log whose sequence number is greater than the first sequence number, and the target running status may or may not be the latest running status of the first production service on the production node.

Optionally, in some embodiments, the redundancy node 90 further includes a sending module 903. The processing module 902 is further configured to:

send a request message to the recording node or the production node by using the sending module 903, where the request message is used to request to obtain a to-be-restored log, and the to-be-restored log includes a log corresponding to a third sequence number, or includes a log corresponding to a sequence number greater than a fourth sequence number; and receive, by using the receiving module 902, the to-be-restored log sent by the recording node or the production node, and restore a locally stored log of the first production service according to the to-be-restored log.

Optionally, in some embodiments, the receiving module 901 is specifically configured to:

receive, according to a preset receive frequency, a connection request sent by the recording node, and establish a communication connection to the recording node according to the connection request, where the connection request may include location information of the production node.

The processing module 902 may determine, according to the location information, at least one of the following:

node information of the first production node that becomes faulty, node information of the production node to which the first production service belongs, or a process number of the first production service, where the node information includes a serial number and/or location information of the production node.

Optionally, in some embodiments, the redundancy node includes a data differentiation component and a redundancy component, and the data differentiation component is communicatively connected to the redundancy component.

Figure 10:
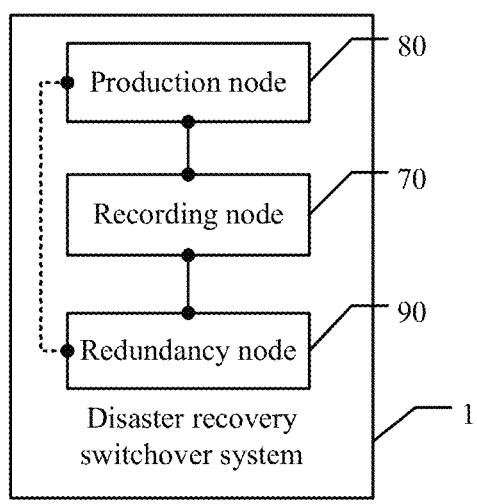
FIG. 10 is a schematic structural diagram of a disaster recovery switchover system according to an embodiment.

4. An embodiment of the present invention further provides a communications system. Referring to FIG. 10, the communications system 1 includes:

the recording node 70 shown in FIG. 7, the production node 80, and the redundancy node 90 shown in FIG. 9.

Figure 11:
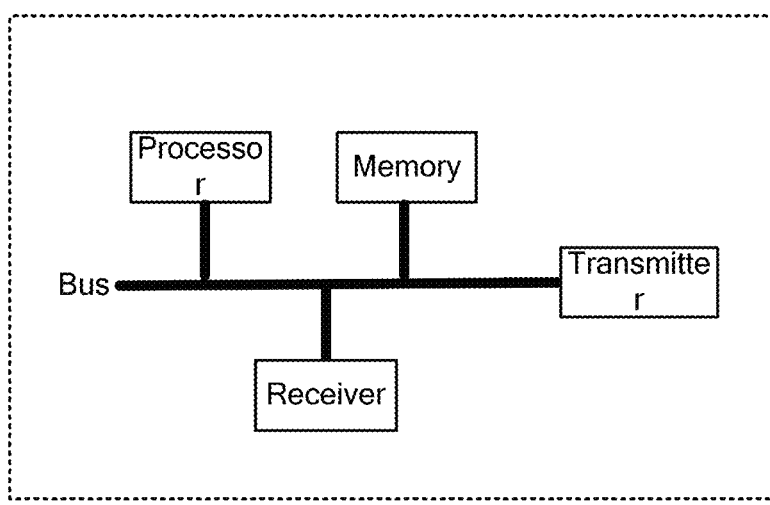
FIG. 11 is a schematic structural diagram of a physical apparatus for executing a disaster recovery switchover method according to an embodiment.

It should be noted that, in the embodiments (including the embodiments shown in FIG. 7 to FIG. 9) of the present invention, physical devices corresponding to all receiving modules may be receivers, physical devices corresponding to all sending modules may be transmitters, and physical devices corresponding to all processing modules may be processors. The apparatuses shown in FIG. 7 to FIG. 9 may have a structure shown in FIG. 11. When one of the apparatuses has the structure shown in FIG. 11, a processor, a transmitter, and a receiver in FIG. 11 implement functions the same as or similar to those of the processing module, the sending module, and the receiving module that are provided in the foregoing apparatus embodiment corresponding to the apparatus. The memory in FIG. 11 stores program code that needs to be invoked by the processor during execution of the foregoing disaster recovery switchover method.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division during actual implementation. For example, multiple modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on multiple network modules. Some or all the modules may be selected according to actual needs to achieve the objectives of the solutions in the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (English full name: Read-Only Memory, ROM for short), a random access memory (English full name: Random Access Memory, RAM for short), a magnetic disk, or an optical disc.

The technical solutions provided in the embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A disaster recovery switchover method, comprising:
receiving, by a recording node of a disaster recovery switchover system, first restoration information from a production node of the disaster recovery switchover system, wherein the first restoration information is information required for restoring a first production service running in the production node to a latest running status of the first production service, wherein the disaster recovery switchover system further includes a redundancy node, the recording node and the production node are deployed at a same location, and a redundancy capability of the recording node is higher than that of the production node; and
sending, by the recording node, second restoration information to the redundancy node in response to determining that the first production service needs to be restored on the redundancy node, wherein the second restoration information is obtained according to the first restoration information and required to restore the first production service on the redundancy node, so that the first production service is switched to the redundancy node according to the second restoration information.

2. The method according to claim 1, wherein the second restoration information comprises at least one first log that is generated when the production node runs the first production service before becoming faulty and is not stored in the redundancy node; and
wherein the sending, by the recording node, second restoration information to the redundancy node comprises:
sending, by the recording node, the second restoration information to the redundancy node, so that the redundancy node receives and stores the at least one first log in the second restoration information, and switches the first production service to a target running status according to a generation sequence of the first log, wherein the target running status is a running status, corresponding to a first log with a latest generation time in the at least one first log, of the first production service.

3. The method according to claim 2, wherein after receiving first restoration information from the production node, the method further comprises:
sending, by the recording node to the production node, a synchronization response corresponding to the first restoration information to notify the production node that latest restoration information currently stored in the recording node is the first restoration information.

4. The method according to claim 3, further comprising:
receiving, by the recording node, a request message from the redundancy node, wherein the request message is used to request to obtain a to-be-restored log; and
sending, by the recording node, the to-be-restored log to the redundancy node, so that the redundancy node restores a locally stored log of the first production service according to the to-be-restored log.

5. The method according to claim 2, wherein the second restoration information further comprises a sequence number corresponding to the first log, and the sequence number is used to determine the generation sequence of the first log on the production node.

6. The method according to claim 1, wherein before sending second restoration information to the redundancy node after determining that the first production service needs to be restored on the redundancy node, the method further comprises:
sending, by the recording node, a connection request to the redundancy node to establish a communication connection with the redundancy node, wherein the connection request is used to instruct the redundancy node to start the first production service.

7. The method according to claim 6, wherein the connection request is sent according to a preset transmit frequency, and the connection request comprises location information of the production node;
wherein the location information is used by the redundancy node to determine at least one of the following:
node information of the production node that becomes faulty,
node information of the production node to which the first production service belongs, or
a process number of the first production service; and
wherein the node information comprises a serial number and/or location information of the production node.

8. A disaster recovery switchover method, comprising:
generating, by a production node of a disaster recovery switchover system, first restoration information corresponding to a first production service hosted by the production node, wherein the first restoration information is required for restoring the first production service to a latest running status of the first production service, wherein the disaster recovery switchover system further includes a redundancy node and a recording node, the recording node and the production node are deployed at a same location, a redundancy capability of the recording node is higher than that of the production node; and
synchronizing, by the production node, the first restoration information to the recording node, so that the recording node sends, when determining that the first production service needs to be restored on the redundancy node, second restoration information to the redundancy node, and the first production service is switched to the redundancy node according to the second restoration information, wherein the second restoration information is obtained according to the first restoration information and is required to restore the first production service on the redundancy node.

9. The method according to claim 8, wherein the second restoration information comprises at least one first log, and the first log is generated when the production node runs the first production service before becoming faulty and is not stored in the redundancy node.

10. The method according to claim 8, wherein the first restoration information comprises a second log, and the synchronizing the first restoration information to the recording node comprises one of the following:
generating, by the production node, the second log, sending the second log to the recording node, and performing, after receiving a synchronization response returned by the recording node, a data operation corresponding to the second log, wherein the synchronization response is used to notify the production node that latest restoration information currently stored in the recording node is the first restoration information; or
generating, by the production node, the second log, performing a data operation corresponding to the second log, and sending the second log to the recording node.

11. A recording node associated with a disaster recovery switchover system, comprising:
a receiver configured to receive first restoration information from a production node of the disaster recovery switchover system, wherein the first restoration information is required for restoring a first production service to a latest running status of the first production service, wherein the disaster recovery switchover system further includes a production node and a redundancy node, the recording node and the production node are deployed at a same location, a redundancy capability of the recording node is higher than that of the production node, the production node currently runs a first production service;
a processor configured to determine whether the first production service needs to be restored on the redundancy node; and
a transmitter configured to send second restoration information to the redundancy node when the processor determines that the first production service needs to be restored on the redundancy node, wherein the second restoration information is obtained according to the first restoration information and is required to restore the first production service on the redundancy node, so that the first production service is switched to the redundancy node according to the second restoration information.

12. The recording node according to claim 11, wherein the second restoration information comprises at least one first log, and the first log is generated when the production node runs the first production service before becoming faulty and is not stored in the redundancy node; and
wherein the processor is configured to send the second restoration information to the redundancy node using the transmitter, so that the redundancy node receives and stores the at least one first log in the second restoration information, and switches the started first production service to a target running status according to a generation sequence of the first log, wherein the target running status is a running status, corresponding to a first log with a latest generation time in the at least one first log, of the first production service.

13. The recording node according to claim 12, wherein after the receiver receives the first restoration information from the production node, the processor is further configured to:
send, using the transmitter to the production node, a synchronization response corresponding to the first restoration information, wherein the synchronization response is used to notify the production node that latest restoration information currently stored in the recording node is the first restoration information.

14. The recording node according to claim 13, wherein the processor is further configured to:
receive, using the receiver, a request message from the redundancy node, wherein the request message is used to request to obtain a to-be-restored log; and
send the to-be-restored log to the redundancy node using the transmitter, so that the redundancy node restores a locally stored log of the first production service according to the to-be-restored log.

15. The recording node according to claim 11, wherein the second restoration information further comprises a sequence number corresponding to the first log, and the sequence number is used to determine the generation sequence of the first log on the production node.

16. The recording node according to claim 11, wherein before the recording node sends the second restoration information to the redundancy node after the processor determines that the first production service needs to be restored on the redundancy node, the processor is further configured to:
   send a connection request to the redundancy node using the transmitter, wherein the connection request is used to instruct the redundancy node to start the first production service; and
   control the recording node to establish a communication connection with the redundancy node.

17. The recording node according to claim 16, wherein the connection request is sent according to a preset transmit frequency, and the connection request comprises location information of the production node;
   the location information is used by the redundancy node to determine at least one of the following:
   node information of the production node that becomes faulty, node information of the production node to which the first production service belongs, or a process number of the first production service; and
   the node information comprises a serial number and/or location information of the production node.

* * * * *

UNITED STATES PATENT AND TRADEMARK OFFICE
CERTIFICATE OF CORRECTION

PATENT NO. : 10,834,186 B2
APPLICATION NO. : 16/264105
DATED : November 10, 2020
INVENTOR(S) : Sinan Wang, Guogen Zhang and Chaoli Qin Page 1 of 1

It is certified that error appears in the above-identified patent and that said Letters Patent is hereby corrected as shown below:

In the Claims

In Claim 12, Column 34, Line 40, delete "and switches the started first" and insert --and switches the first--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*